United States Patent
Tabata

[19]

[11] Patent Number: 5,885,187
[45] Date of Patent: Mar. 23, 1999

[54] INTEGRAL CONTROL SYSTEM FOR ENGINE AND AUTOMATIC TRANSMISSION

[75] Inventor: Atsushi Tabata, Okazaki, Japan

[73] Assignee: Toyota Jidosha Kabushiki Kaisha, Toyota, Japan

[21] Appl. No.: 867,482

[22] Filed: Jun. 2, 1997

[30] Foreign Application Priority Data

Jun. 3, 1996 [JP] Japan ..................................... 8-162376

[51] Int. Cl.⁶ ........................... F16H 61/02; B60K 41/04
[52] U.S. Cl. ........................... 477/107; 477/109; 477/906
[58] Field of Search ................................... 477/107, 101, 477/109, 120, 906

[56] References Cited

U.S. PATENT DOCUMENTS

| | | | |
|---|---|---|---|
| 4,493,228 | 1/1985 | Vukovich et al. ....................... | 477/109 |
| 4,677,880 | 7/1987 | Hattori et al. ....................... | 477/109 X |
| 4,924,832 | 5/1990 | Abe ...................................... | 477/102 X |
| 5,048,372 | 9/1991 | Sodeno et al. ....................... | 477/111 X |
| 5,050,453 | 9/1991 | Yamaguchi ......................... | 477/116 X |
| 5,058,013 | 10/1991 | Iwatsuki et al. ..................... | 477/109 X |
| 5,265,498 | 11/1993 | Fodale et al. ......................... | 477/109 |
| 5,385,516 | 1/1995 | Grange et al. ......................... | 477/107 |
| 5,559,694 | 9/1996 | Kraemer et al. ..................... | 477/107 X |
| 5,582,558 | 12/1996 | Palmeri et al. ......................... | 477/109 |
| 5,593,365 | 1/1997 | Tabata et al. . | |
| 5,595,551 | 1/1997 | Hedstrom et al. ....................... | 477/109 |

FOREIGN PATENT DOCUMENTS

| | | |
|---|---|---|
| 5-187530 | 7/1993 | Japan . |
| 5-67864 | 9/1993 | Japan . |
| 5-67865 | 9/1993 | Japan . |
| 6-32240 | 4/1994 | Japan . |
| 7-32915 | 2/1995 | Japan . |

*Primary Examiner*—Dirk Wright
*Assistant Examiner*—Peter T. Kwon
*Attorney, Agent, or Firm*—Oblon, Spivak, McClelland, Maier & Neustadt, P.C.

[57] ABSTRACT

An integral control system for an engine and an automatic transmission of a vehicle, in which the automatic transmission capable of setting a plurality of running and stop ranges is connected to an engine capable of having output characteristics matching the ranges. A range set in the automatic transmission is detected, and the engine is controlled when a failure of plural ones of the ranges is detected by the range detecting means, in accordance with the ones, as minimizing the engine torque, of the engine output characteristics corresponding to the detected ranges.

18 Claims, 8 Drawing Sheets

FIG.5

| POSITION | | CLUTCH | | | BRAKE | | | | | O.W.C | | | SOLENOID | | |
|---|---|---|---|---|---|---|---|---|---|---|---|---|---|---|---|
| | | C1 | C2 | C0 | B1 | B2 | B3 | B4 | B0 | F1 | F2 | F0 | SL1 | SL2 | SL3 |
| R | 1st | X | O | O | X | X | X | O | X | X | X | O | O | X | O |
| R | 2nd | X | O | X | X | X | X | O | O | X | X | X | O | X | X |
| N | | X | X | O | X | X | X | X | X | X | X | X | O | X | O |
| D · 3 · 2 · (L) | 1st ORDINARY | O | X | O | X | X | X | X | X | X | O | O | O | X | X |
| D · 3 · 2 · (L) | 1st E/G BRAKE | O | X | O | X | X | X | O | X | X | O | O | O | X | O |
| D · 3 · 2 · (L) | 2nd ORDINARY | O | X | X | X | X | O | X | X | X | X | O | O | O | X |
| D · 3 · 2 · (L) | 2nd E/G BRAKE | O | X | O | X | X | O | X | X | X | X | O | O | O | O |
| D · 3 · 2 · (L) | 3rd ORDINARY | O | X | O | X | O | X | X | X | O | X | O | X | O | X |
| D · 3 · 2 · (L) | 3rd E/G BRAKE | O | X | O | O | O | X | X | X | O | X | O | X | O | O |
| D · 3 · 2 · (L) | 4th | O | O | O | X | O | X | X | X | X | X | O | X | X | O |
| D · 3 · 2 · (L) | 5th | O | O | X | X | O | X | X | O | X | X | X | X | X | X |

INTEGRAL CONTROL SYSTEM FOR ENGINE AND AUTOMATIC TRANSMISSION

BACKGROUND OF THE INVENTION

1. Field of the Invention

The present invention relates to a system for controlling an engine in a vehicle and an automatic transmission connected to the engine and, more particularly, to a control system for reducing a torsional torque, as might otherwise be left in a power transmission line.

2. Related Art

The power transmission line from the automatic transmission to the drive wheels of a vehicle is not completely rigid so that it elastically deforms. As a result, when the torque is inputted whereas a rotary member at the input side is fixed while the wheels being braked, the torsional deformation of the power transmission line is left as it is so that the torsional torque is accumulated. Since the automatic transmission of the vehicle is connected to the engine through a torque converter acting as a fluid coupling, as well known in the art, it is usual that the rotary member at the input side is not completely fixed. In a parking (P) range, however, the rotation of the output shaft of the automatic transmission is stopped by a parking gear and a parking lock pole meshing with the former, so that the torsional deformation of the power transmission line from the output shaft to the drive wheels is left.

When the torsional torque is accumulated in the P-range, it is released as the range is shifted from the P-range to another range to make such shocks or noises that the driver may feel uncomfortable. In the invention disclosed in JP-A-7-32915, therefore, the engine torque is reduced, when the vehicle is stopped in a reverse (R) range just before the shift to the P-range, thereby to reduce the torsional torque which might otherwise be accumulated in the power transmission line from the automatic transmission to the drive wheels.

In the system of the prior art described above, the engine torque is reduced under the two conditions that the R-range is set and that the vehicle is stopped. Of these, the R-range is generally detected in an electric manner. In the case of an electric failure, therefore, the control to reduce the engine torque cannot be executed because of the misjudgment of the range. Since the torsional torque to be left in the power transmission line increases in this case, it is abruptly released at the shift from the P-range to another range to make the shocks or noises.

Moreover, the aforementioned torsional torque resides not only in the shift to the P-range but also in the R-range in dependence upon the gear train. The torsional torque also resides in the automatic transmission which is constructed such that an auxiliary transmission unit constructed mainly of a set of planetary gear mechanism and adapted to be switched at two high and low stages is connected to the input side of a main transmission unit for setting a reverse stage and a plurality of forward stages, such that the auxiliary transmission unit is set to a directly connected stage or a low speed stage by a one-way clutch and to a high speed stage by applying a brake, and such that the auxiliary transmission unit is set to the high speed stage at the reverse stage. In the automatic transmission of this kind, more specifically, when an outputting rotary element in the auxiliary transmission unit is rotated backward while being set to the high speed stage by applying its brake, the one-way clutch is applied to integrate the auxiliary transmission unit as a whole so that the rotation is stopped in that state by the brake. In the R-range, therefore, the torsional torque acts in the direction to rotate the outputting rotary element of the auxiliary transmission unit backward so that the auxiliary transmission unit is left fixed as a whole to allow the torsional torque to reside.

When the engine torque is reduced while the vehicle is stopped in the R-range, the torsional deformation of the power transmission line can be suppressed to reduce the residual torsional torque. In this case, however, the engine torque cannot be reduced, when the range is misjudged because of the electric failure, and the residual torsional torque may increase.

Moreover, the construction is made to prefer the N-range when the two contacts (i.e., the contact for the R-range and the contact for the N-range) of a shift position sensor fail. Then, the control of the N-range is made even when the R-range is set in fact, so that the auxiliary transmission unit (or the overdrive unit) is directly connected in the R-range. As a result, the torque to be inputted to the main transmission unit may be increase to lower the durabilities of the clutches and/brakes in the main transmission unit.

SUMMARY OF THE INVENTION

A main object of the present invention is to prevent a torsional torque effectively from being left in a power transmission line.

Another object of the present invention is to avoid the reduction in the durabilities of frictional engagement elements such as clutches and/or brakes in a main transmission unit even when a shift position switch fails to change the conduction pattern of a shift position from a normal one.

According to an aspect of the present invention, there is provided an integral control system for an engine and an automatic transmission of a vehicle, in which an automatic transmission capable of setting a plurality of running and stop ranges is connected to an engine capable of having output characteristics matching the ranges. When the plural ranges are simultaneously detected because of some failure, the engine is controlled in accordance with the ones, as minimizing the engine torque, of the engine output characteristics corresponding to the detected ranges.

As a result, even when the shift position switch fails so that the conduction pattern is different from that of the normal R-range, the torque to be inputted to the main transmission unit can be reduced to avoid the reduction in the durabilities of the clutches and/or brakes.

According to another aspect of the present invention, there is provided an integral control system for an engine and an automatic transmission of a vehicle including an automatic transmission, in which an auxiliary transmission unit capable of switching at least two high and low stages is connected to the input side of a main transmission unit capable of setting a reverse stage and a plurality of forward stages and is switched from the high speed range to the low speed range in a predetermined range so that the torque of the engine is reduced on the basis of the switching of the auxiliary transmission unit from the high speed stage to the low speed stage. The torque of the engine is reduced when it is detected by the range detecting means that any of the plural ranges including the predetermined one is set, when it is detected by the low speed stage control detecting means that the control to set the auxiliary transmission unit to the low speed stage is executed, when it is detected by the engine load detecting means that the engine load is no more than a predetermined value, and when the stopped state is detected by the stop detecting means.

In this control system, therefore, it is limited when the auxiliary transmission unit is controlled to the low speed stage and when the engine load is light that any of the predetermined plural ranges is set and that the engine torque is reduced during the stop of the vehicle. Thus, when the engine load is lowered by releasing the accelerator pedal so as to bring the vehicle into the stopped state, the engine torque is reduced to eliminate or reduce the torsional deformation of the power transmission line and the accompanying torsional torque. When the engine load is increased by depressing the accelerator pedal so as to start the vehicle, the control to reduce the engine torque is not executed so that the starting acceleration can be kept in a satisfactory state.

According to still another aspect of the present invention, there is provided an integral control system for an engine and an automatic transmission of a vehicle, in which an automatic transmission capable of setting a plurality of ranges including a reverse range for a backward run is connected to an engine. The engine torque is reduced when the range set in the automatic transmission is any of the reverse range and the other plural ranges and when the stop detecting means detects the stopped state of the vehicle.

In this control system, therefore, the engine torque is reduced in the plural range including the reverse range and in the stopped state so that the engine torque reduction is executed even when the reverse range, even set, is misjudged as another range. As a result, the torsional deformation, as caused in the stopped state, of the power transmission line can be suppressed to reduce or eliminate the residual torsional torque.

According to a further aspect of the present invention, there is provided an integral control system for an engine and an automatic transmission of a vehicle including an automatic transmission, in which an auxiliary transmission unit capable of switching at least two high and low stages is connected to the input side of a main transmission unit capable of setting a reverse stage and a plurality of forward stages and is switched from the high speed range to the low speed range in a backward range so that the torque of the engine is reduced on the basis of the switching of the auxiliary transmission unit from the high speed stage to the low speed stage. The backward range is preferred when the plural ranges including the backward range are detected.

In this control system, therefore, the reverse range is preferred when the range detection fails so that the plural ranges including the reverse range are detected. Thus, the torsional torque is prevented from being accumulated in the power transmission line, and the auxiliary transmission unit is set to reduce the torque to be inputted to the main transmission unit. As a result, the durabilities of the frictional engagement elements such as the clutches and/or brakes of the main transmission unit are prevented from lowering.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a diagram tabulating clutch/brake application chart, i.e., the combinations of the applications/releases of frictional engagement elements for setting the individual gear stages in the automatic transmission;

DESCRIPTION OF THE PREFERRED EMBODIMENTS

Figure 3:
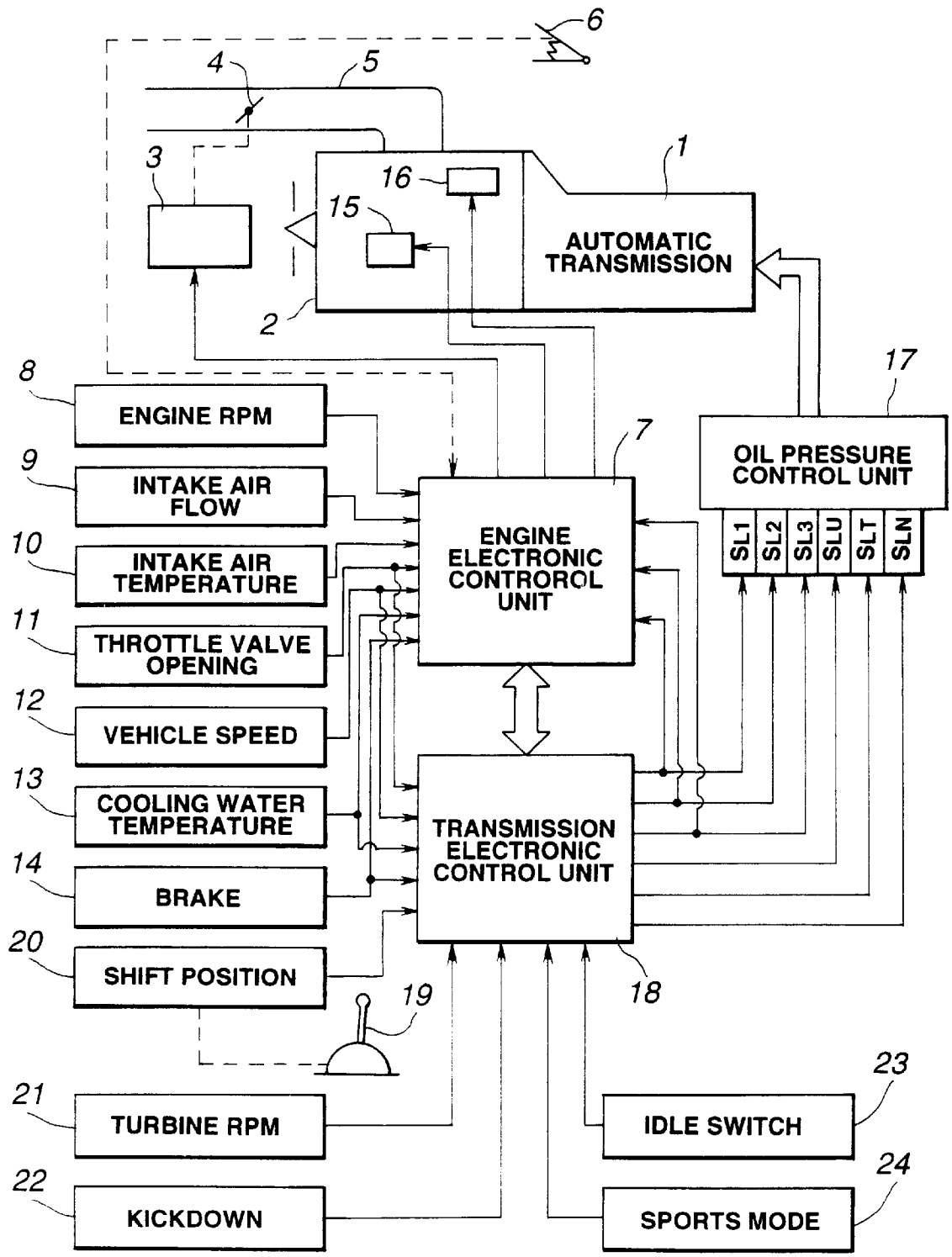
FIG. 3 is a block diagram schematically showing the entire control line of an engine and an automatic transmission, to which is applied the present invention.

The present invention will be specifically described with reference to the accompanying drawings. First of all, brief description will be made on the entire control line of a vehicle to which is applied the present invention. In FIG. 3, an engine 2, as connected to an automatic transmission 1, is constructed to control its output electrically and is equipped at its intake pipe 5 with an electronic throttle valve 4 to be driven by a throttle actuator 3 made of a servo motor. On the other hand, the degree of opening of an accelerator, i.e., the stroke of depression of an accelerator pedal 6 for controlling the output of the engine 2 is detected by the not-shown sensor, and its detected signal is inputted to an engine electronic control unit (E-ECU) 7.

This electronic control unit 7 is composed mainly of a central processing unit (CPU), a memory unit (RAM, ROM) and an input/output interface. To the electronic control unit 7, there are inputted signals coming from: an engine RPM sensor 8 for detecting the RPM of the engine 2; an intake air flow sensor 9 for detecting the intake air flow of the engine 2; an intake air temperature sensor 10 for detecting the temperature of the intake air; a throttle sensor 11 for detecting the degree of opening 0 of the electronic throttle valve 4; a cooling water temperature sensor 13 for detecting the cooling water temperature of the engine 2; and a brake switch 14 for detecting the action of the brake. On the basis of these data, the engine electronic control unit 7 controls a fuel injection valve 15 for controlling the fuel injection rate; controls the igniter 16 for controlling the ignition timing; controls not-shown bypass valve for controlling the idle speed; and performs all the throttle controls including the traction control by controlling the electronic throttle valve 4 by the throttle actuator 3.

In the automatic transmission 1, the speed changes, the ON/OFF of the lockup clutch, the line pressure, and/or the apply pressure of a predetermined frictional engagement element are controlled by an oil pressure control unit 17. This oil pressure control unit 17 is constructed to be electrically controlled and is equipped with first to third shift solenoid valves SL1 to SL3 for executing the speed changes with and without the engine braking state, a linear solenoid valve SLT for controlling the line pressure, a linear solenoid valve SLN for controlling the accumulator back pressure, and a linear solenoid valve SLU for controlling the apply pressures of the lockup clutch and a predetermined frictional engagement element.

There is also provided an automatic transmission electronic control unit (T-ECU) 18 for controlling the speed changes, the line pressure and/or the accumulator back pressure by outputting signals to those solenoid valves. This automatic transmission electronic control unit 18 is composed mainly of a central processing unit (CPU), a memory unit (RAM, ROM) and an input/output interface. To this electronic control unit 18, there are inputted as the control data not only the signals coming from the throttle sensor 11, the vehicle speed sensor 12, the cooling water temperature sensor 13 and the brake switch 14 but also the signals coming from: a shift position sensor 20 for detecting the shift position of a shift lever 19; a turbine RPM sensor 21 for detecting the turbine RPM in the automatic transmission 1; a kickdown switch 22 for detecting the kickdown in which the accelerator pedal 6 is depressed to its maximum stroke; an idle switch for detecting the idling state in which the accelerator pedal 6 is completely returned; and a sports mode switch 24 for detecting the sports mode in which the speed changes are executed by the manual shift.

On the other hand, the automatic transmission electronic control unit 18 and the engine electronic control unit 7 are so connected with each other that they can communicate with each other to exchange the data. The signal such as the intake air flow per revolution is transmitted from the engine electronic control unit 7 to the automatic transmission electronic control unit 18, whereas the signal such as a signal equivalent to the instruction signal of each solenoid valve or a signal instructing a gear stage is transmitted from the automatic transmission electronic control unit 18 to the engine electronic control unit 7.

Specifically, automatic transmission electronic control unit 18: decides the gear stage, the ON/OFF of the lockup clutch, or the regulated level of the line pressure or the apply pressure on the basis of the input data or the prestored map; outputs the instruction signal to a predetermined solenoid valve on the basis of the decision result; and decides a failure and makes a control against the failure. On the other hand, the engine electronic control unit 7: controls the fuel injection rate, the ignition timing or the opening of the electronic throttle valve 4 on the basis of the input data; reduces the fuel injection rate or changes the ignition timing at a shifting time of the automatic transmission 1; and reduces the output torque temporarily by throttling the opening of the electronic throttle valve 4.

Figure 4:
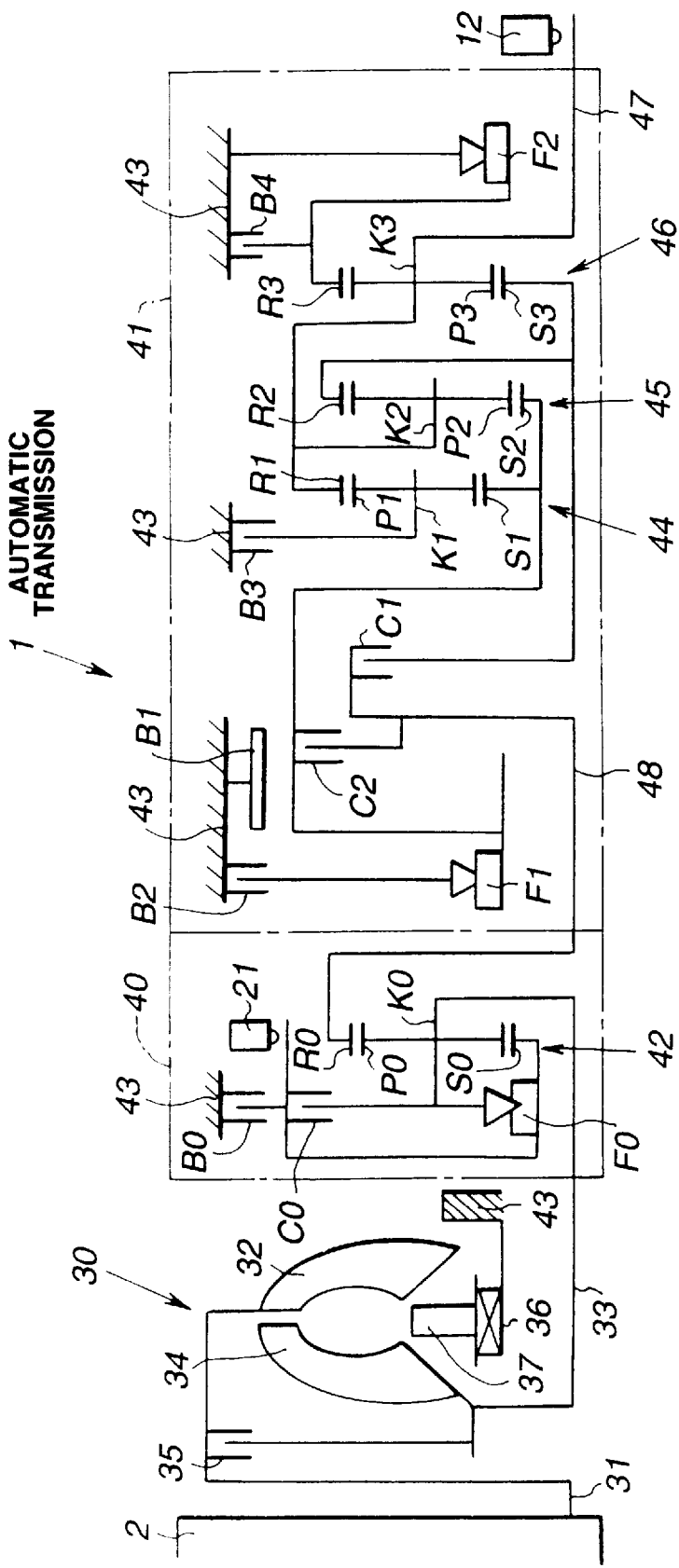
FIG. 4 is a skeleton diagram showing one example of the gear train in the automatic transmission, to which is applied the present invention.

FIG. 4 shows one example of the gear train of the automatic transmission 1 described above. In the shown example, the gear train is constructed to set five forward gear stages and reverse gear stages and is connected through a torque converter 30 to the engine 2. This torque converter 30 is equipped with: a pump impeller 32 connected to the crankshaft 31 of the engine 2; a turbine runner 34 connected to the input shaft 33 of the automatic transmission 1; a lockup clutch 35 connecting those pump impeller 32 and turbine runner 34 directly; and a stator 37 prevented from rotating in one direction by a one-way clutch 36.

The aforementioned automatic transmission 1 is constructed of an auxiliary transmission unit 40 for switching two high and low gear stages, and a main transmission unit 41 capable of switching reverse gear stages and four forward gear stages. The auxiliary transmission unit 40 is equipped with: a planetary gear mechanism composed of a sun gear S0, a ring gear R0, and a pinion P0 rotatably supported by a carrier K0 and meshing with those sun gear S0 and ring gear R0; a clutch C0 and a one-way clutch F0 interposed between the sun gear S0 and the carrier K0; and a brake B0 interposed between the sun gear S0 and a housing 43.

The main transmission unit 41 is equipped with: a first planetary gear mechanism 44 composed of a sun gear S1, a ring gear R1, and a pinion P1 rotatably supported by a carrier K1 and meshing with those sun gear S1 and ring gear R1; a second planetary gear mechanism 45 composed of a sun gear S2, a ring gear R2, and a pinion P2 rotatably supported by a carrier K2 and meshing with those sun gear S2 and ring gear R2; and a third planetary gear mechanism 46 composed of a sun gear S3, a ring gear R3, and a pinion P3 rotatably supported by a carrier K3 and meshing with those sun gear S3 and ring gear R3.

The sun gears S1 and S2 are connected to each other, and the ring gears R1 and carries K2 and K3 are connected to one another, of which the carrier K3 is connected to an output shaft 47. On the other hand, the ring gear R2 is connected to the sun gear S3. Moreover, a first clutch C1 is interposed between the ring gear R2 or the sun gear S3, and an intermediate shaft 48, and a second clutch C2 is interposed between the sun gears S1 and S2 and the intermediate shaft 48. In the housing 43, there is mounted a first brake B1 of band type for stopping the rotations of the sun gear S1 and the sun gear S2. Between the sun gears S1 and S2 and the housing 43, there are interposed in tandem a first one-way clutch F1 and a brake B2. This first one-way clutch F1 is applied when the sun gear S1 and the sun gear S2 are to turn backward of the input shaft 33.

A third brake B3 is interposed between the carrier K1 and the housing 43. Between the ring gear R3 and the housing 43, there are interposed in parallel a fourth brake B4 and a second one-way clutch F2. This second one-way clutch F2 is applied when the ring gear R3 is to rotate backward. The clutches C0, C1 and C2 and the brakes B0, B1, B2, B3 and B4 are hydraulic type frictional engagement elements, the frictional members of which are applied by the oil pressure.

The automatic transmission 1 described above can set five forward gear stages and reverse gear stages. The application chart of FIG. 5 tabulates the applied/released states of the individual frictional engagement elements for setting those gear stages and the ON/OFF states of the shift solenoid valves SL1 to SL3 for actuating those frictional engagement elements. In FIG. 5, symbols ○ indicate the applied states of the frictional engagement elements and the ON states of the shift solenoid valves, and symbols X indicate the released states of the frictional engagement elements and the OFF states of the shift solenoid valves.

In order that the brake B0 may be applied to set the auxiliary transmission unit 40 in the overdrive state (at a high speed stage), as seen from FIG. 5, the third solenoid valve SL3 is turned OFF. On the other hand, this third solenoid valve SL3 is turned OFF when the vehicle is at the 1st to 3rd speeds but requires no engine braking effect. Therefore, the output pressure of the third solenoid valve SL3 is used on one hand as a control signal for setting the auxiliary transmission unit 40 to the high speed stage and is inverted on the other hand so that it may be used as the control signal for controlling the engine braking effect at the intermediate and lower gear stages. As a result, the ON/OFF patterns of the shift solenoid valves SL1 to SL3 are identical at the ordinary reverse stage (i.e., the second reverse speed) and at the ordinary 1st speed. Even when the R-range and the D-range are misjudged either in the stopped state or in a low speed stage near the stopped state, it is possible to prevent the auxiliary transmission unit 40 from entering the low speed stage (or the directly connected state) at the reverse stages or the engine braking effect from becoming active at the first forward speed.

In the state where the sports mode switch 24 is operated to select the sports mode, on the other hand, the individual solenoid valves SL1 to SL3 are turned ON/OFF for the engine (E/G) braking effect, as shown in FIG. 5. In the sports mode, therefore, the engine braking effects prevails at all the forward gear stages.

Here will be briefly described a shift device for selecting the individual ranges in the automatic transmission mode and for selecting the individual gear stages in the sports mode (or the manual transmission mode). As this shift device, there can be adopted a device, as disclosed in JP-A-5-89370 or JP-A-5-145497.

Figure 6:
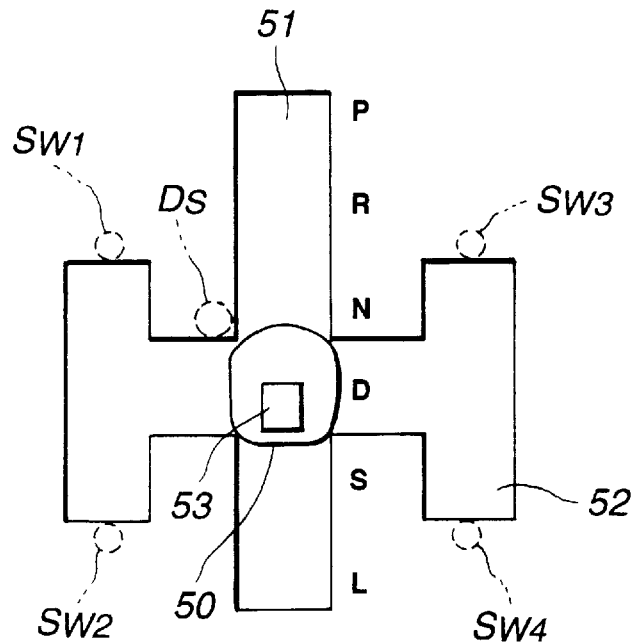
FIG. 6 is a diagram showing an array of the shift positions of a shift device, as can select a sports mode.
Figure 7:
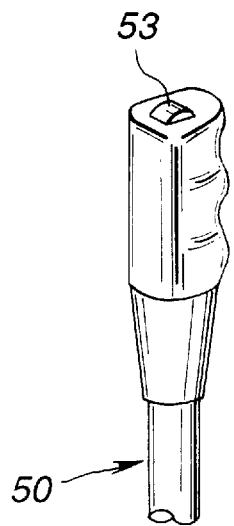
FIG. 7 is a perspective view of a grip portion of the shift device.

Specifically, FIGS. 6 and 7 show the shift device, as disclosed in JP-A-5-89370. A guide groove, in which an I-shaped groove 51 and an H-shaped groove 52 are combined, is formed as one for guiding a shift lever 50 which is manually operated by the driver. The I-shaped groove 51 forms a shift passage for the automatic mode to guide the shift lever 50 so as to select the individual ranges of parking (P), reverse (R), neutral (N), drive (D), 2nd speed holding second (S) and 1st speed holding low (L) ranges in the automatic mode. These range positions are assigned sequentially in the recited order downward of FIG. 6 to the shift passage of the I-shaped groove 51.

On the other hand, the H-shaped groove 52 is one forming a shift passage for the manual mode to guide the shift lever 50 so as to select any of the four forward stages in the manual mode. The center position of the H-shaped groove 52 is superposed at the D-range position of the I-shaped groove 51. In other words, the D-range position is shared between the individual shift passages and is equipped with a D-position sensor Ds for outputting a signal when the shift lever 50 is located at that position. Moreover, the H-shaped groove 52 is equipped at its individual four crests with gear stage switches SW1, SW2, SW3 and SW4 to be activated by the shift lever 50. These gear stage switches SW1, SW2, SW3 and SW4 are switches (or sensors) for outputting signals instructing the gear stages to be set in the sports mode, and their suffix numerals designate the corresponding gear stages, as arranged in FIG. 6, for example.

FIG. 7 shows the grip portion of the shift lever 50 described above. This grip portion is equipped at its top portion with a mode selecting switch 53. This switch 53 is one which is turned ON/OFF at each push so that it outputs a manual mode selecting signal when ON and an automatic mode selecting state when OFF. Incidentally, this switch may preferably be equipped with means such as a light emitting diode (LED) for emitting a light when ON so that its ON/OFF state can be visually confirmed.

Figure 8:
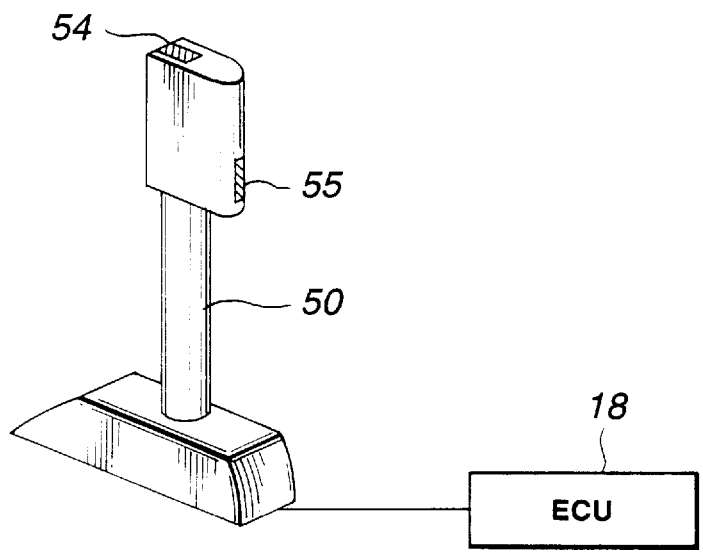
FIG. 8 is a schematic perspective view of another shift device capable of selecting the sports mode.
Figure 9:
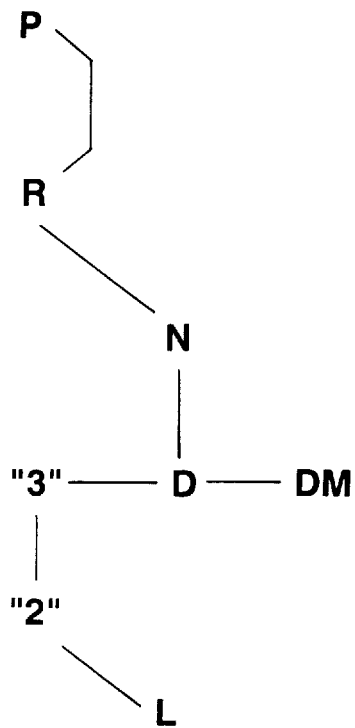
FIG. 9 is a diagram showing the array of the shift positions of the shift device.

Moreover, FIGS. 8 and 9 show the device which is disclosed in JP-A-5-145497. The grip portion of the shift lever 50 is equipped at its top with an upshift switch 54 and at its lower portion facing forward with a downshift switch 55. These switches 54 and 55 are connected with the electronic control unit 18. The individual range positions, selected by the shift lever 50, in the automatic transmission mode and the positions for setting the manual shift mode are arrayed, as shown in FIG. 9.

In FIG. 9, the individual range positions of the parking (P), reverse (R), neutral (N) and drive (D) ranges are set sequentially downward of the recited order. At the lefthand side of the drive range position, there is set a "3" range position for effecting the speed changes among the 1st speed to the 3rd speed. Below the "3" range position (i.e., at the back side of the vehicle), there are set sequentially in the recited order a "2" range position for effecting the speed changes between the 1st speed and the 2nd speed and the low (L) range position. At the righthand side of the drive range position, on the other hand, there is disposed a direct mode (DM) position, in which a (not-shown) DM switch is arranged, for setting the sports mode. Moreover, the shift device, as shown in FIG. 8, is constructed to effect upshifts step by step, each time the upshift switch 54 is turned ON after the shift lever 50 was brought to the DM position, and downshifts step by step each time the downshift switch 55 is turned ON.

When a reverse stage is to be set in the automatic transmission 1 described above, the brake B0 in the auxiliary transmission unit 40 is applied, as shown in FIG. 5. The one-way clutch F0, as located between the sun gear S0 to be fixed by the brake B0 and the carrier K0, is applied when the sun gear S0 is to rotate forward with respect to the carrier K0, that is, when the carrier K0 is to rotate backward of the sun gear S0. Thus, the auxiliary transmission unit 40 is integrated in the backward direction.

At a reverse stage to be set by setting the auxiliary transmission unit 40 to a high speed stage, on the other hand, the vehicle can also be stopped as at an ordinary forward stage so that the accelerator pedal 6 can be depressed with the output shaft 47 being fixed by the braking action, thereby to increase the output of the engine 2, i.e., the input to the automatic transmission 1. Even when the accelerator pedal 6 is released to lower the input, the backward rotation of the auxiliary transmission unit 40 is blocked so that a torsion, as established in the lower transmission line from the input shaft 33 to the (not-shown) drive wheels, is retained to leave the torsional torque. When this torsional torque is or may be internally accumulated, the control system of the present invention makes the following control to suppress or prevent the internal accumulation of the torsional torque.

Figure 10:
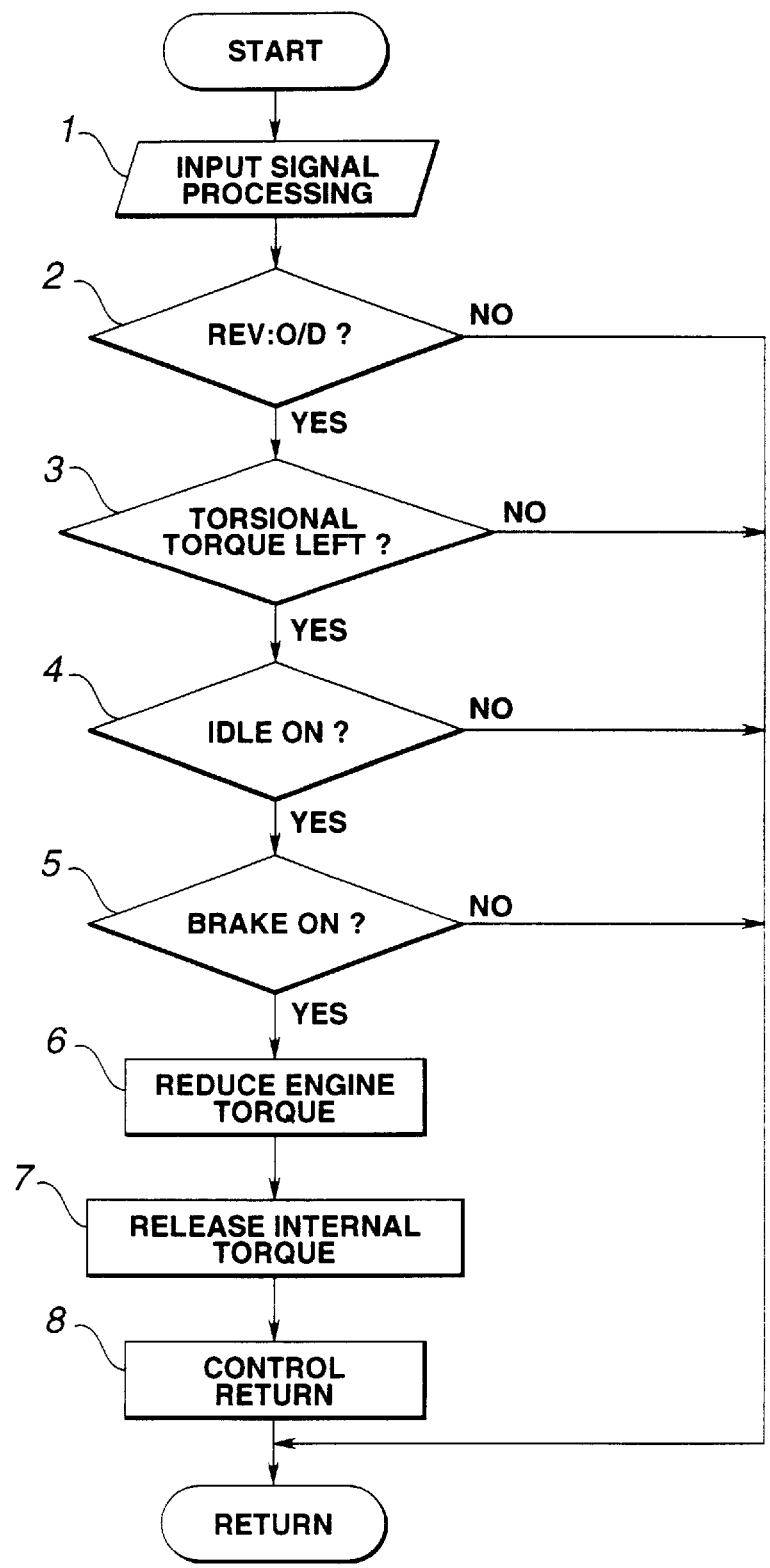
FIG. 10 is a flow chart for explaining one example of the release control of the residual torsional torque.

FIG. 10 is a flow chart showing one example of the control routine. After an input signal processing (at Step 1), it is decided (at Step 2) whether or not the auxiliary transmission unit 40 is set at the high speed stage of the reverse stages (that is: Rev: O/D?). As described above, the first condition for the torsional torque to be left is that the brake B0 of the auxiliary transmission unit 40 is applied to set the auxiliary transmission unit 40 to the high speed stage. When the answer of Step 2 for this decision is NO, the routine is returned without any special control.

When the answer of Step 2 is YES, it is decided (at Step 3) whether or not the torsional torque is left (or accumulated). This decision can be made depending upon that the throttle opening $\theta$ is at a predetermined value or more at the vehicle speed of "0" (or with the rotation of the output shaft 47 being blocked) or that the state continues for a predetermined time period or longer. When the answer of Step 3 is NO, the routine is returned without any special control because there is left no torsional torque to be released.

When the answer is YES, on the other hand, it is decided (at Step 4) whether or not the idle state is ON. This is because the torsional torque cannot be released while it is being applied to the power transmission line and because the durability, as might otherwise be caused by the excessive slips of the frictional engagement elements accompanying the release of the torsional torque, is prevented from lowering. Since this means that the lower output of the engine 2 is sufficient, the decision on the idle ON may be replaced by a decision on whether or not the throttle opening is less than a predetermined reference value.

When the answer of Step 4 is NO, the routine is returned without any special control. When YES, on the other hand, it is decided (at Step 5) whether or not the brake is ON (or activated). This Step is one for deciding whether or not the torsional torque is released by the rotations of the drive wheels. Therefore, this Step 5 can be replaced by a decision on whether or not the state of a vehicle speed V at substantial zero is continued for a predetermined time period. When the brake is not active so that the output shaft 47 can rotate, the torsional torque, as loaded upon the power transmission line, can be released as the rotations of the drive wheels. With the brake being OFF (or inactivated), the routine is returned without any control. With the brake being ON, on the other hand, the engine torque is reduced (at Step 6).

This is a control for keeping the torque to be inputted to the automatic transmission 1 at a low level while the remaining torsional torque being released. Specifically, the engine torque is lowered by keeping the opening of the electronic throttle valve 4 at a small value or by delaying the ignition timing. In this state, the residual torque is released (at Step 7).

This residual torque is one which is internally accumulated as the torsion of the power transmission line from the input shaft 33 to the drive wheels by increasing the torque to be fed to the input shaft 33 with the rotation of the output shaft 47 being stopped. And, the release of the residual torque is to release the accumulated torsion with the output shaft 47 or the drive wheels being fixed and held irrotational. Therefore, the torsional torque, as left in the aforementioned automatic transmission 1, is caused from the torsion which is established by increasing the input torque while activating the brake at the reverse stage (i.e., at the second speed in the R-range) set by raising the auxiliary transmission unit 40 to the high speed stage, while the relative rotations of the rotary elements participating in the power transmission being blocked in that state.

At the aforementioned Step 7, the control is made to allow the relative rotations of the rotary elements which are prevented from rotating relatively while the torsional torque being held by releasing the residual torque. Specifically, the auxiliary transmission unit 40 is switched to the low gear stage (i.e., at the first speed in the R-range). In short, the brake B0 is released, and the clutch C0 is applied. The brake B0 and the one-way clutch F0 are applied to fix the auxiliary transmission unit 40 entirely in the backward rotational direction thereby to accumulate the torsional torque, as described above. Therefore, the auxiliary transmission unit 40 and the input shaft 33 are rotated backward by the torsional torque remaining in the inside when the brake B0 is released whereas the clutch C0 is applied to bring the auxiliary transmission unit 40 entirely into the state to rotate together in either direction. This is because the torque converter 30 is interposed between the auxiliary transmission unit 40 and the engine 2. As a result, the torsion in the power transmission line is eliminated to release the torsional torque.

As a release control in place of the aforementioned one, a slip is established by lowering the apply pressure of the second clutch C2 and/or the fourth brake B4 having set the reverse state in the main transmission unit 41. By this control, the torsion, as caused in the power transmission line, is eliminated by the relative rotations between the rotary elements which are connected by those frictional engagement elements. Incidentally, the control to lower the apply pressures of those frictional engagement elements may be executed by lowering those apply pressures of the frictional engagement elements individually, but the apply pressures may be lowered altogether by lowering the line pressure. Simultaneously as this line pressure is lowered, the apply pressure of the brake B0 in the auxiliary transmission unit 40 is lowered. In a frictional engagement element having a high loaded torque, a slip occurs at first to eliminate the torsion so that all the frictional engagement elements are not always slipped.

After the aforementioned release control of the internal residual torque, a return control is made (at Step 8), and this routine is ended at the end of the control. Incidentally, this return control is to return the state, which is temporarily changed for releasing the internal torque, to the initial state by restoring the initial operation pattern, when the combination (or the operation pattern) of applying/releasing the frictional engagement elements for setting a reverse stage is changed, and by restoring the initial pressure when the line pressure is lowered.

In the control described above, the engine torque is lowered on condition that the R-range is detected. When the range is misjudged, the control to lower the engine torque is not executed. In the R-range, therefore, a high torque may be inputted to the main transmission unit 41 to adversely affect the durabilities of the second clutch C2 and the fourth brake B4 setting the reverse stages. It is therefore preferred to make a control to lower the engine torque in the R-range and in another range such as the D-range.

Figure 1:
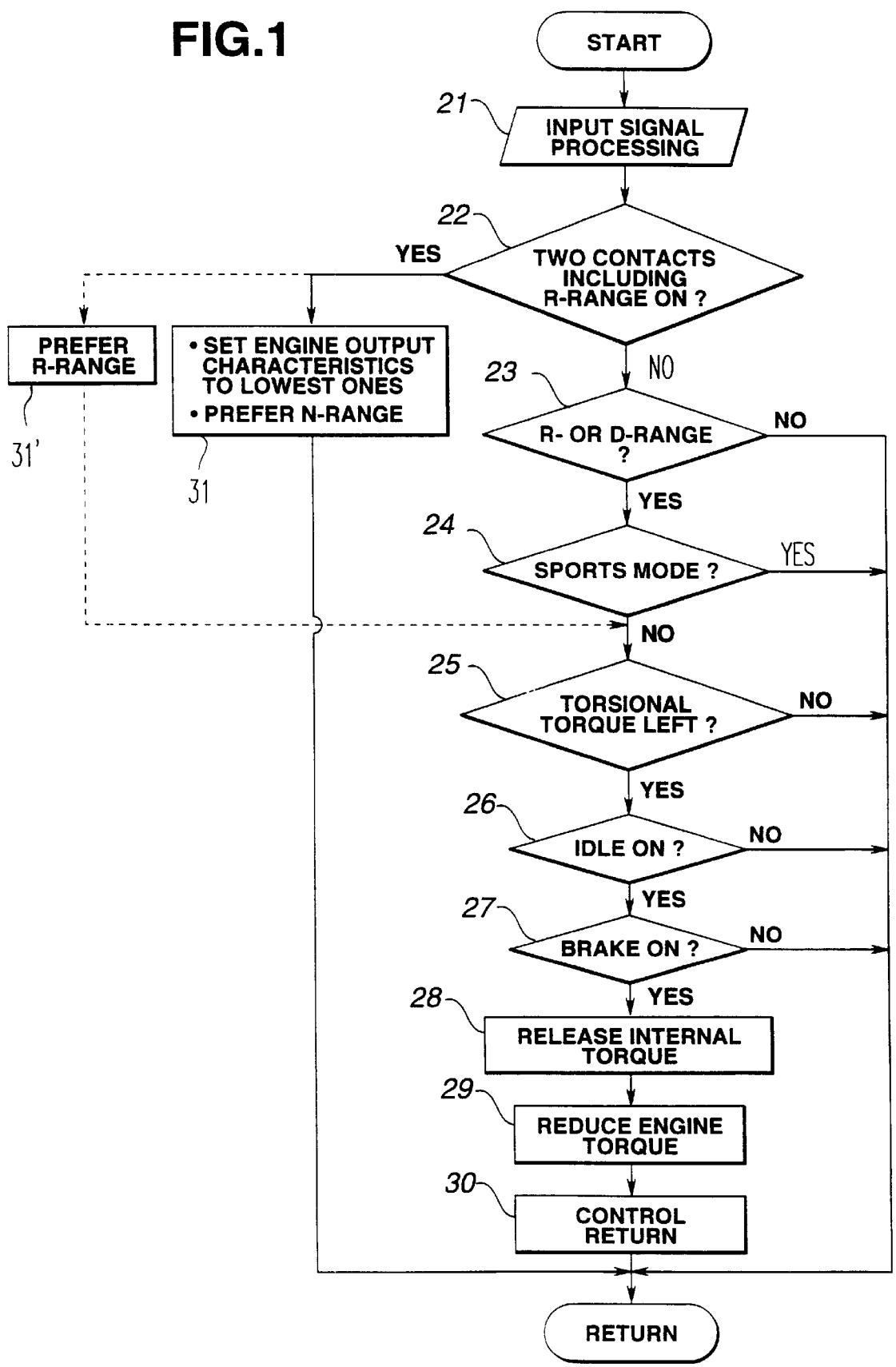
FIG. 1 is a schematic flow chart showing one example of the control to lower an engine torque in accordance with the release control of a torsional torque, as executed in the present invention.

One example of this control is shown in FIG. 1. After the input signal processing (at Step 21), it is decided (at Step 22) whether or not signals indicating a plurality of ranges including the R-range are outputted, that is, whether or not the two contacts including the R-range are ON. This is the failure which is caused by the invasion of a conductive liquid into the shift device or by the shorting of the electric circuit, so that it can be decided on the basis of the input signal to the automatic transmission electronic control unit 18. Incidentally, the operation of this Step 22 corresponds to range detecting means in the present invention.

When the answer of Step 22 is NO, it is decided (at Step 23) the R-range or the D-range is selected. Specifically, the aforementioned electronic control unit 18 for the automatic transmission 1 is constructed to detect the range position, as selected by operating the shift lever, electrically on the basis of the signal outputted from the shift device, and to decide that the D-range is selected, from the standpoint of the fail-safe when the shift position signal is not outputted in the least from the shift device. Therefore, the decision of Step 23 is made because the D-range is outputted by the failure although the R-range is selected as a matter of fact. Incidentally, the operation of Step 23 corresponds to range selecting means in the present invention.

When the answer of Step 23 is NO, the routine is returned without any special control. When the answer is YES, it is decided (at Step 24) whether or not the sports mode is selected. This decision can be made in the aforementioned shift device, as shown in FIGS. 6 and 7, on the basis of the signal which is outputted by operating the mode selecting switch 53, and in the shift device, as shown in FIGS. 8 and 9, on the basis of the signal which is outputted by operating the shift lever 50 to the direct mode position.

When the sports mode is selected, there is little probability in the so-called "double failures" in which two signals instructing the gear stages are simultaneously outputted.

Thus, the routine is returned without any special control when the sports mode is selected so that the answer of Step 24 is YES. When the answer of Step 24 is NO, on the other hand, it is decided (at Step 25) whether or not the torsional torque is left. This is a control step similar to Step 3 of FIG. 10. In addition to this Step 25, the operation of Step 29 may be executed while omitting the following operations of Steps 26, 27 and 28, in the system in which the auxiliary transmission unit 40 is directly connected to prevent the torsional torque from remaining, when the vehicle speed is zero (that is, the vehicle is stopped) not depending upon whether or not the torsional torque is left.

The routine is returned when the answer of Step 25 is NO. When this answer is YES, it is decided (at Step 26) whether or not the idle state is ON. The operation of this Step 26 corresponds to load detecting means in the present invention and belongs to a control step identical to the aforementioned Step 4 shown in FIG. 10. The routine is returned without any special control when the answer of Step 26 is NO. When YES, on the other hand, it is decided (at Step 27) whether or not the brake is ON (or activated). This Step 27 is a control step identical to Step 5 shown in FIG. 10 and can be replaced by a decision on whether or not the state of the vehicle speed V at substantial zero is continued for a predetermined time period. Therefore, the operation of this Step 27 corresponds to stop detecting means in the present invention. When the brake is not activated so that the output shaft 47 can rotate, the torsional torque, as loaded upon the power transmission line, can be released as the rotations of the drive wheels. When the brake is OFF (or inactivated), therefore, the routine is returned without any special control. When the brake is ON, on the other hand, the control to release the internal torque is executed (at Step 28).

As described above, the torsional torque, as left in the transmission line of the power from the automatic transmission 1 to the drive wheels, is established when the backward rotation of the input shaft 33 is stopped with the drive wheels or the output shaft 47 being rotationally stopped. The backward rotation of the input shaft 33 is blocked by setting the auxiliary transmission unit 40 to a high speed stage. Therefore, the control to release the internal torque at Step 28 is made by executing a control to set the auxiliary transmission unit 40 to a low gear stage. Specifically, the release control is achieved by turning ON the third shift solenoid valve SL3. Thus, the operation of this Step 28 corresponds to low gear stage control detecting means in the present invention.

As tabulated in FIG. 5, more specifically, the reverse gear stages are usually set by setting the auxiliary transmission unit 40 to the high speed stage so that the third shift solenoid valve SL3 is turned OFF. In this state, the brake B0 in the auxiliary transmission unit 40 is applied, and the one-way clutch F0 is applied to fix the auxiliary transmission unit 40 as a whole when the intermediate shaft 48 or the ring gear R0 is to be rotated backward in that state. At Step 28, the third shift solenoid valve SL3 is turned ON to set the auxiliary transmission unit 40 to a low speed stage. As a result, the brake B0 is released to allow the ring gear R0 of the auxiliary transmission unit 40 to rotate so that the residing torsional torque is released.

Incidentally, the ON/OFF patterns of the shift solenoid valves SL1 to SL3 are made identical at the ordinary reverse stage and at the first forward speed. By making the ON/OFF patterns of the 1st speed of the D-range and the R-range identical, the engine braking effect is prevented from active at the 1st speed in the D-range to raise the shift shock, and the auxiliary transmission unit 40 is prevented from taking a low speed one of the reverse stages to cause the slip of the frictional engagement elements, even the range is misjudged. When the third shift solenoid valve SL3 is turned ON to release the torsional torque, as described above, the conductive pattern is to activate the engine braking effect at the 1st speed in the D-range. However, the control content can be changed to limit the engine braking effect at the 1st speed to the case where the sports mode is set, that is, to inactivate the engine braking effect at the 1st speed in the D-range, so that any special trouble is caused even when the range is misjudged.

After the aforementioned control to release the internal torque, the control to reduce the engine torque is executed (at Step 29). This control corresponds to engine torque reducing means in the present invention and can be executed by changing the characteristics of the throttle opening to the accelerator opening, i.e., the engine output characteristics. In the automatic transmission 1 under consideration, as shown in FIG. 3, the opening of the electronic throttle valve 4 is controlled by processing the stroke of depression of the accelerator pedal 6 electrically, so that the control characteristics of the throttle opening to the stroke of depression of the accelerator pedal 6 can be changed.

Figure 2:
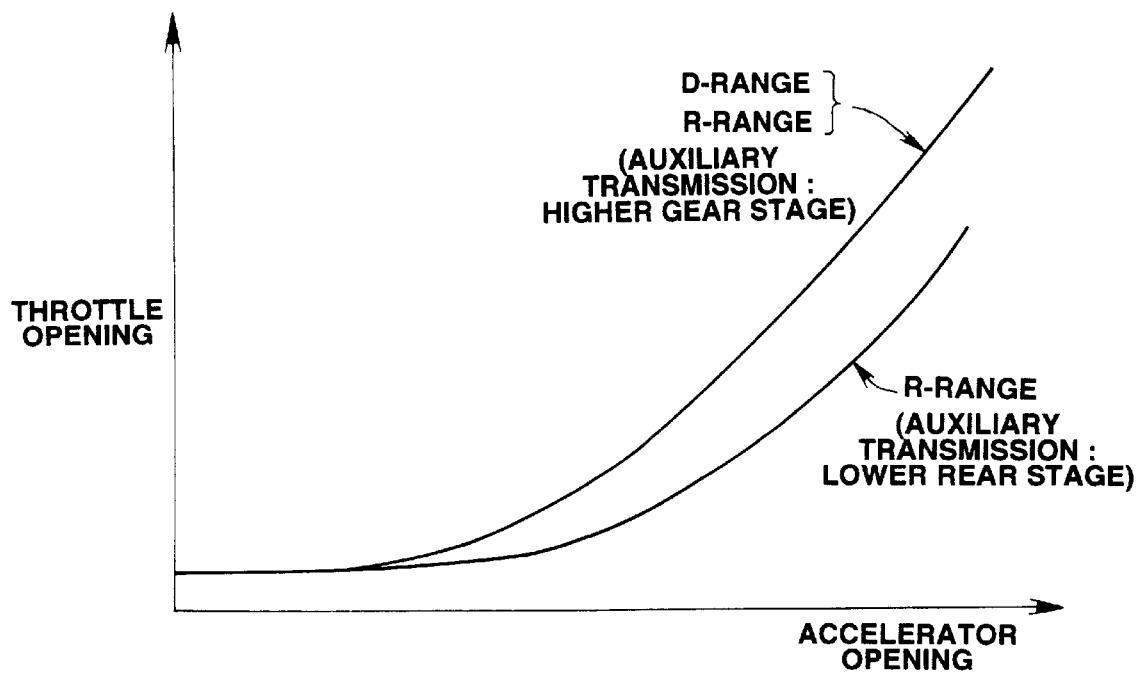
FIG. 2 is a diagram illustrating an example of the engine output characteristics, i.e., the relation between an accelerator opening and a throttle opening according to ranges.

In one example, as illustrated in FIG. 2, the characteristics of the throttle opening to the accelerator opening in the D-range and at the 2nd reverse speed (i.e., at the ordinary reverse stage) are set at higher opening characteristics (or at higher output characteristics) than those of the throttle opening to the accelerator opening at the 1st reverse speed (i.e., at the reverse stage which is set by setting the auxiliary transmission unit to the low speed stage). At Step 29, therefore, the engine torque is lowered by changing the output characteristics, as illustrated in FIG. 2. Incidentally, an alternative control may be made to lower the engine output torque by delaying the ignition timing or by reducing the fuel injection rate or temporarily stopping the fuel injection itself.

The reason why the control is made to reduce the engine torque will be described in the following. In the automatic transmission 1 equipped with the gear train shown in FIG. 4, the gear ratio in the reverse state, as set by the main transmission unit 41, grows considerably large. At the reverse stage setting time, therefore, the auxiliary transmission unit 40, as arranged at the input side of the main transmission unit 41, is set to a high speed stage to lower the torque to be inputted to the main transmission unit 41. Thus, when the engine output characteristics are raised to the ordinary ones with the auxiliary transmission unit 40 being set at a low speed stage for releasing the torsional torque, a high torque is inputted to the main transmission unit 41 even temporarily when the accelerator pedal 6 is abruptly depressed. This raises a probability to lower the durabilities of the second clutch C2 and the fourth brake B4 setting the reverse state. In order to prevent this situation in advance, therefore, the engine output characteristics are lowered when the auxiliary transmission unit 40 is set to a low speed stage for releasing the torsional torque.

Incidentally, the aforementioned engine torque reducing control is executed, when the throttle opening is increased to an extent to accumulate the torsional torque and then throttled to an extent of the idling state, but not when the throttle opening is continuously kept in a large state. In the case of the stall start, therefore, where the brake is released while the depression of the accelerator pedal is kept in the vehicle stopped state, the engine output characteristics are not especially lowered. As a result, even when the 1st speed in the D-range is misjudged as the R-range, the engine torque at the starting time can be kept at a sufficiently high level so that the starting performance is not deteriorated.

After the execution of the aforementioned control of Step 29, a return control is made (at Step 30). This control is identical to that of Step 8 of FIG. 10.

When the answer of Step 22 is YES, that is, when the plural ranges including the R-range are decided, on the other hand, the engine output characteristics corresponding to those ranges are set to the lowest ones (at Step 31). The operation of this Step 31 corresponds to engine torque control means in the present invention and sets the engine output characteristics in the R-range in which the auxiliary transmission unit 40 is at the low speed stage. When the ranges including the R-range are judged, more specifically, the R-range may probably be set as a matter of fact, and the auxiliary transmission unit 40 may probably be at the low speed stage. Thus, the engine output characteristics are set to the low ones so as to prevent an excessive torque to be applied to the frictional engagement element such as the fourth brake B4 for setting the reverse state in the main transmission unit 41. When the N-range is contained in the decided ranges, the N-range is preferentially decided. This is to prevent a serious torque from being applied to the frictional engagement elements to cause the slip or the torsional torque from being accumulated.

In the system according to the present invention, moreover, the aforementioned Step 31 may be replaced by a control (of Step 31') to decide the R-range preferentially. Specifically, the pattern for the reverse stages is set as the ON/OFF pattern of the shift solenoid valves. As a result, the torque to be inputted to the main transmission unit 41 is reduced so that the torque to be applied to the frictional engagement elements is reduced to take an advantage in the improvement in the durabilities of the frictional engagement elements. As a matter of fact, when the forward range is set, the auxiliary transmission unit 40 can take a low speed stage to prevent the torsional torque from being accumulated. Thus, the operation of Step 31' corresponds to reverse range preferring means in the present invention.

The present invention has been described in connection with its specific embodiment but can be applied to a control system for an automatic transmission which is equipped with either an engine other than that shown in FIG. 3 or a gear train other than that shown in FIG. 4.

Here will be synthetically described the advantages to be achieved by the present invention. According to the system of the present invention, the plural ranges including such one are detected as may allow the torsional torque to be accumulated in the power transmission line. As a result, the engine output characteristics are controlled to those of the output characteristics corresponding to the detected range, which take the lowest torque, even when a range other than that which may allow the torsional torque to be accumulated is to be decided. This suppresses the torsional deformation or torque of the power transmission line, as might otherwise follow the misjudgment of the range.

In the present invention, moreover, even when any of ranges is set while the vehicle is being stopped, the reduction in the engine torque is limited to the case where the auxiliary transmission unit is controlled to a low speed stage and where the engine load is low. As a result, when the engine load is lowered by releasing the accelerator pedal so as to set the vehicle in the stopped state, the engine torque is reduced to eliminate or reduce the torsional deformation of the power transmission line and the accompanying torsional torque. When the engine load is increased by depressing the accelerator pedal for staring the vehicle, the control to reduce the engine torque is not made so that the startability can be kept in a satisfactory state.

According to the present invention, furthermore, the engine torque is lowered in the ranges including the reverse range and in the vehicle stopped state so that it is lowered even when the reverse range, even if set, is misjudged as another range. As a result, the torsional deformation, as established in the vehicle stopped state, of the power transmission line can be suppressed to lower or reduce the torsional torque which might otherwise be left.

In the control system according to the present invention, furthermore, the reverse range is preferred when the ranges including it are detected. As a result, it is possible to prevent the torsional torque from being accumulated in the power transmission line, as might otherwise be caused by the auxiliary transmission unit at a low speed range in ranges other than the reverse range. When the range is in fact the reverse range, the torque to be inputted to the main transmission unit at the high speed stage of the auxiliary transmission unit can be lowered to prevent the durabilities of the frictional engagement elements such as the clutches and/or brakes of the main transmission unit from being lowered.

What is claimed is:

1. An integral control system for an engine and an automatic transmission of a vehicle, in which the automatic transmission capable of setting a plurality of running and stop ranges is connected to the engine capable of having output characteristics matching said ranges, comprising:
    range detecting means for detecting a range set in said automatic transmission; and
    engine torque control means for controlling said engine, when a failure comprising plural ones of said ranges is detected by said range detecting means, in accordance with the ones, as minimizing the engine torque, of said engine output characteristics corresponding to said detected ranges.

2. An integral control system for an engine and an automatic transmission according to claim 1,
    wherein said engine torque control means includes means for changing the degree of opening of a throttle valve with respect to the stroke of depression of an accelerator pedal.

3. An integral control system for an engine and an automatic transmission according to claim 1,
    wherein said engine torque control means includes means for making the opening of a throttle valve corresponding to the depression stroke of an accelerator pedal in the case where said range detecting means detects the plural ranges simultaneously, smaller than that in the case where said range detecting means fails to detect the plural ranges simultaneously.

4. An integral control system for an engine and an automatic transmission according to claim 1,
    wherein said range detecting means includes means for detecting, when two kinds of signals for the individual ranges are simultaneously outputted, the ranges corresponding to the individual signals simultaneously.

5. An integral control system for an engine and an automatic transmission according to claim 1, further comprising:
    manual mode switching means manually activated for switching the gear stages of said automatic transmission,
    wherein when the manual mode is set, the engine control by said engine torque control means is unexecuted.

6. An integral control system for an engine and an automatic transmission of a vehicle which has: the automatic transmission, in which an auxiliary transmission unit capable of switching at least two high and low stages is connected to the input side of a main transmission unit capable of setting a reverse stage and a plurality of forward stages; and the engine connected to said automatic transmission, so that the torque of said engine is reduced on the basis of the switching of said auxiliary transmission unit from the high speed stage to the low speed stage in a predetermined range the control system comprising:

range detecting means for detecting the range which is set in said automatic transmission;

low speed stage control detecting means for detecting that the control for setting said auxiliary transmission unit to the low speed stage is executed;

engine load detecting means for detecting a load on said engine;

stop detecting means for detecting the vehicle stopped state; and engine torque reducing means for reducing the torque of said engine when it is detected by said range detecting means that any of the plural ranges including said predetermined one is set, when it is detected by said low speed stage control detecting means that the control to set said auxiliary transmission unit to the low speed stage is executed, when it is detected by said engine load detecting means that said engine load is no more than a predetermined value, and when the stopped state is detected by said stop detecting means.

7. An integral control system for an engine and an automatic transmission according to claim 6, wherein said auxiliary transmission unit includes a gear train in which a member for transmitting the torque to said main transmission unit can rotate backward not at the high speed stage but at the low speed stage.

8. An integral control system for an engine and an automatic transmission according to claim 6, wherein said engine torque reducing means includes any one of means for changing a throttle valve opening with respect to an accelerator pedal depression stroke, means for changing an ignition timing in said engine, and means for changing an injection rate of a fuel in said engine.

9. An integral control system for an engine and an automatic transmission according to claim 6, wherein said engine load detecting means includes means for detecting a load state from that said engine is in an idling state.

10. An integral control system for an engine and an automatic transmission according to claim 6, wherein said stop detecting means includes one of means for detecting a braking operation and means for detecting the stopped state on the basis of a vehicle speed.

11. An integral control system for an engine and an automatic transmission according to claim 6, further comprising:

manual mode switching means manually activated for switching the gear stages of said automatic transmission, wherein when the manual mode is set, the engine control by said engine torque control means is unexecuted.

12. An integral control system for an engine and an automatic transmission of a vehicle, in which the automatic transmission capable of setting a plurality of ranges including a reverse range for a backward run is connected to an engine, comprising:

range detecting means for detecting a range set in said automatic transmission;

stop detecting means for detecting the stopped state of said vehicle; and engine torque reducing means for reducing the engine torque when the range detected by said range detecting means is any of the reverse range and the other plural ranges and when said stop detecting means detects the stopped state of said vehicle.

13. An integral control system for an engine and an automatic transmission according to claim 12, wherein said engine torque reducing means includes any of means for changing a throttle valve opening with respect to an accelerator pedal depression stroke, means for changing an ignition timing in said engine, and means for changing an injection rate of a fuel in said engine.

14. An integral control system for an engine and an automatic transmission according to claim 12, wherein said stop detecting means includes one of means for detecting a braking operation and means for detecting the stopped state on the basis of a vehicle speed.

15. An integral control system for an engine and an automatic transmission according to claim 12, further comprising:

manual mode switching means manually activated for switching the gear stages of said automatic transmission, wherein when the manual mode is set, the engine control by said engine torque control means is unexecuted.

16. An integral control system for an engine and an automatic transmission of a vehicle which has: the automatic transmission, in which an auxiliary transmission unit capable of switching at least two high and low stages is connected to the input side of a main transmission unit capable of setting a reverse stage and a plurality of forward stages; and the engine connected to said automatic transmission, so that the torque of said engine is reduced on the basis of the switching of said auxiliary transmission unit from the high speed stage to the low speed stage in a reverse range, the control system comprising:

range detecting means for detecting the range which is set in said automatic transmission; and reverse range preferring means for outputting an instruction signal for setting the reverse range when a failure comprising plural ranges including the reverse range is detected by said range detecting means.

17. An integral control system for an engine and an automatic transmission according to claim 16, wherein said auxiliary transmission unit includes a gear train in which a member for transmitting the torque to said main transmission unit can rotate backward not at the high speed stage but at the low speed stage and which is set to the low speed stage at a low speed gear stage in a forward range.

18. An integral control system for an engine and an automatic transmission according to claim 16, further comprising:

a plurality of solenoid valves to be turned ON/OFF for setting said automatic transmission to a plurality of gear stages including the reverse stage; and a controller for controlling said solenoid valves so that the ON/OFF states of said solenoid valves may be identical at the reverse stage and at the low speed gear stage in the forward range.

* * * * *

UNITED STATES PATENT AND TRADEMARK OFFICE
CERTIFICATE OF CORRECTION

PATENT NO. : 5,885,187

DATED : March 23, 1999

INVENTOR(S): ATSUSHI TABATA

It is certified that an error appears in the above-identified patent and that said Letters Patent is hereby corrected as shown below:

Claim 6, line 11, change "range the control" to --range, the control--.

Signed and Sealed this

Second Day of November, 1999

Attest:

Q. TODD DICKINSON

Attesting Officer

Acting Commissioner of Patents and Trademarks